United States Patent
Morioka (10) Patent No.: US 12,073,127 B2
(45) Date of Patent: Aug. 27, 2024

(54) SYSTEM AND METHOD OF CONTROLLING SYSTEM

(71) Applicant: CANON KABUSHIKI KAISHA, Tokyo (JP)

(72) Inventor: Kazuya Morioka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/486,979

(22) Filed: Oct. 13, 2023

(65) Prior Publication Data
US 2024/0134578 A1 Apr. 25, 2024
US 2024/0231710 A9 Jul. 11, 2024

(30) Foreign Application Priority Data
Oct. 19, 2022 (JP) .................................. 2022-167808

(51) Int. Cl.
*G06F 3/12* (2006.01)
*H04N 1/00* (2006.01)

(52) U.S. Cl.
CPC .......... *G06F 3/1204* (2013.01); *G06F 3/1238* (2013.01); *H04N 1/0023* (2013.01)

(58) Field of Classification Search
None
See application file for complete search history.

(56) References Cited

U.S. PATENT DOCUMENTS

| 7,154,616 B2* | 12/2006 | Watanabe | G06Q 30/06 705/52 |
| 2008/0068649 A1* | 3/2008 | Emori | G06F 3/1226 358/1.15 |
| 2009/0180141 A1* | 7/2009 | Takaishi | G03G 15/5075 358/1.15 |
| 2011/0170131 A1* | 7/2011 | Kondo | H04N 1/34 358/1.14 |
| 2022/0019387 A1* | 1/2022 | Saeda | G06F 3/1218 |

FOREIGN PATENT DOCUMENTS

JP 2022018773 A 1/2022

* cited by examiner

*Primary Examiner* — Haris Sabah
(74) *Attorney, Agent, or Firm* — CANON U.S.A., INC. IP Division (57) ABSTRACT

According to one aspect of the present disclosure, a print service relays an authentication request and a document acquisition request received from a multi-function printer to a document management service, and transmits authentication information and information of printing result acquired from the document acquisition request to the document management service. The document management service transmits a result of an authentication process, a document, and charge information to the print service based on a request received from the print service, stores and manages the information of print result received from the print service in association with a user account, and performs a process for charging a user for the printing later based on the information of print result.

8 Claims, 8 Drawing Sheets

SYSTEM AND METHOD OF CONTROLLING SYSTEM

BACKGROUND

Field

The present disclosure relates to a system and method of controlling the system.

Description of the Related Art

In recent years, cloud services related to image processing apparatuses have become popular. For example, there is a print cloud service in which an image file or a document file to be printed is uploaded to the cloud service in advance so that the image file or the document file can be printed from any of multi-function printers installed in a shared space or a public place. Among these types of services, there is a service in which, when a user logs in to a shared multi-function printer using a user account of the service and performs printing, the user is not immediately charged for the printing on the spot, but an account administrator is charged in a lump at a later date.

In addition, among cloud services, there is a document management service operating cooperatively with a file server accessible only by a specific user to perform document management or cooperate with other cloud services On the other hand, a system in which multiple cloud services cooperate with each other is also widespread. Japanese Patent Application Laid-Open No. 2022-018773 discloses a technique of performing a printing process using a print cloud service by designating a document stored in a file server accessible only by a specific user via the print cloud service that provide a printing service using a shared multi-function printer.

In the print cloud service that collectively charges a user at a later date for the printing service via the use of a shared multi-function printer, the user is required to log in with an account managed by the print cloud service when the user wishes to have the later collective charging service. That is, when the user logs in with an account of another service, the user is not able to have the later collective charging service for printing provided by the print cloud service.

According to the print processing of the above Japanese Patent Application Laid-Open No. 2022-018773, a document is designated via the print cloud service, but printing is performed by logging in with an account of another cloud service (document management service) that manages the document. Therefore, according to the print processing of Japanese Patent Application Laid-Open No. 2022-018773, the user cannot have the later collective charging service even when the print cloud service provides that service. In other words, in a case where a user logs in with an account of another service cooperating with a printing service and the user performs printing using the print service via a shared image processing apparatus, the user cannot have the later collective charging service and needs to pay a charge for the printing on the spot.

It may be possible to solve this problem by creating accounts in the respective cloud services and causing the accounts to cooperate with each other. However, this solution requires a user to doubly manage the accounts, which takes time and effort.

As described above, it has been desired to improve usability of a system in which multiple cloud services cooperate with each other for users using a single account of cloud service.

SUMMARY

According to an aspect of the present disclosure, a system provides a print service for performing printing via an image processing apparatus and a management service for managing documents and operating cooperatively with the print service, the system including a memory that stores a program and a processor that executes the program to perform: transferring, from the print service to the management service, an authentication request received from the image processing apparatus; executing, in the management service, an authentication process based on the authentication request received from the print service; transferring, from the print service to the management service, an acquisition request of acquiring a document and authentication information received from the image processing apparatus; in receipt of the acquisition request from the print service, transmitting charge information from the management service to the print service, the charge information indicating whether provision of the document and printing of the document via use of the print service correspond to predetermined charging or not; transmitting, from the print service to the image processing apparatus, the charge information and the document received from the management service; when the printing of the document is performed using the image processing apparatus, transmitting, from the print service to the management service, information of the printing and the authentication information; managing the information of the printing in the management service, the managing including linking the information of the printing to a user account corresponding to the authentication information received from the print service; and executing a process for charging a user corresponding to the user account for the printing based on the information of the printing.

Further features of the present disclosure will become apparent from the following description of exemplary embodiments with reference to the attached drawings.

DESCRIPTION OF THE EMBODIMENTS

The embodiments of the present disclosure will now be described with reference to the drawings.

Figure 1:
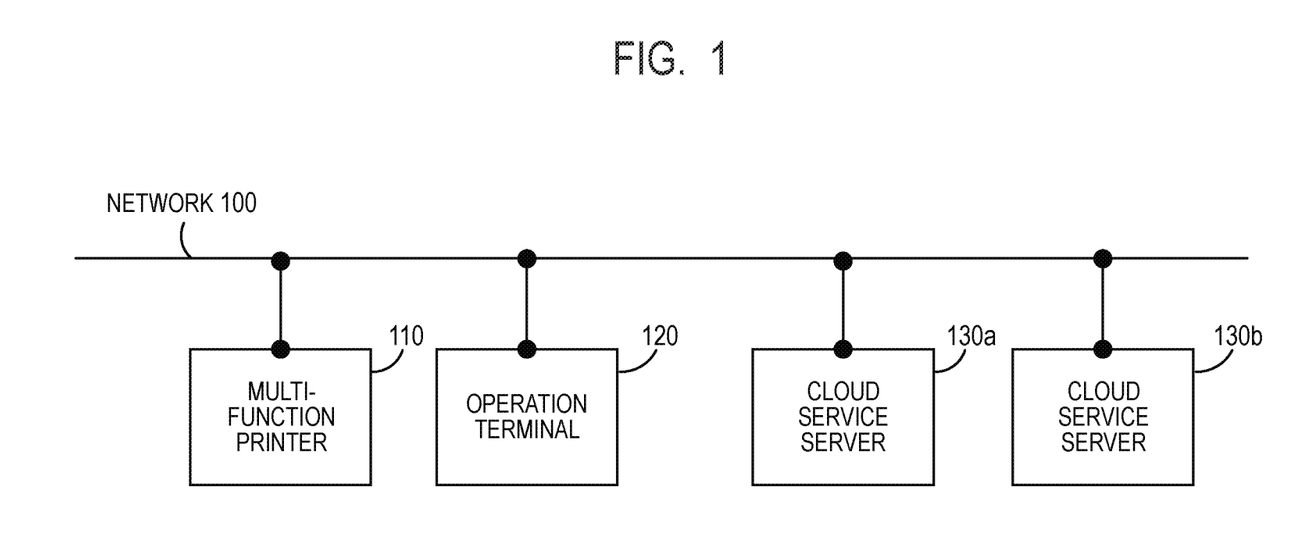
FIG. 1 shows a system configuration diagram depicting an example of an entire system according to one or more aspects of the present disclosure.

FIG. 1 shows a system configuration diagram depicting an example of an entire system according to an embodiment of the present disclosure. A multi-function printer 110, an operation terminal 120, and multiple cloud service servers 130 (130a and 130b) are connected to a network 100.

The multi-function printer 110 is an image processing apparatus (image forming apparatus) that realizes multiple types of functions such as printing, copying, and faxing. The operation terminal 120 is an information processing apparatus capable of communicating with the multi-function printer 110 via the network 100. Here, as the operation terminal 120, a smartphone or a tablet will be described as an example, but the operation terminal 120 may be a personal computer (PC) or the like.

As an example of the cloud service server 130a, a server for a cloud service will be described in which an image file or a document file to be printed is uploaded in advance so that any compatible multi-function printer installed in a shared space or a public place can perform printing. Hereinafter, a cloud service operating in the cloud service server 130a is referred to as a "print cloud service" or a "print service".

Further, as an example of the cloud service server 130b, a cloud service capable of performing document management and cooperatively operating with another cloud service and a file server that is accessible only by a specific user will be described. A cloud service operating in the cloud service server 130b is referred to as a "document management service for business" or a "document management service".

FIGS. 2A to 2D are block diagrams each showing a hardware configuration of each device included in the system of the present embodiment.

Figure 2A:
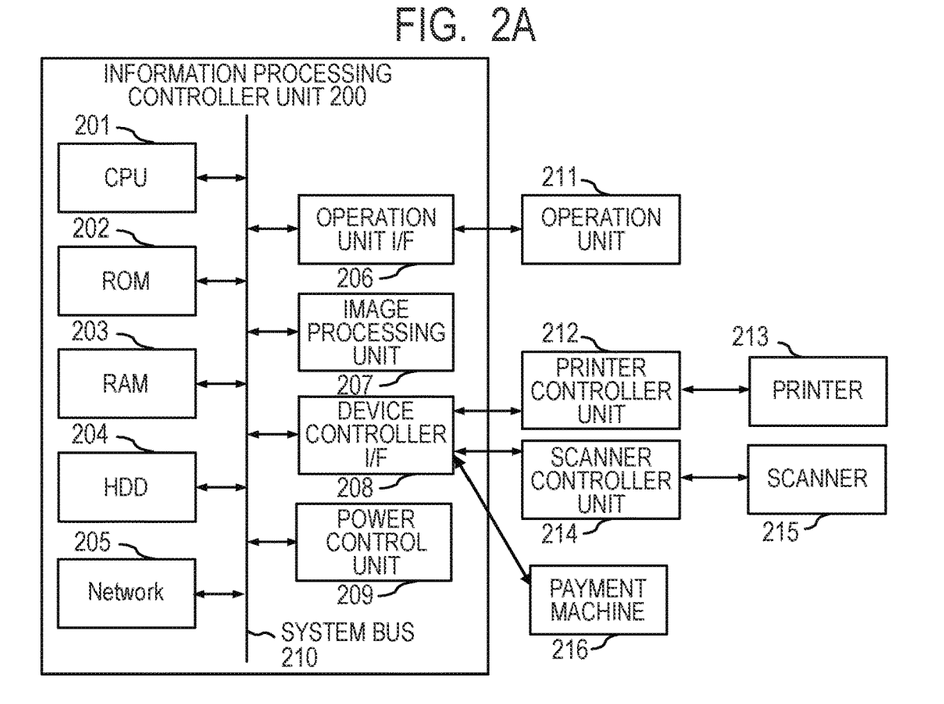
FIG. 2A shows a hardware configuration of devices included in the system according to one or more aspects of the present disclosure.

FIG. 2A is a block diagram showing an example of a hardware configuration of the multi-function printer 110. The multi-function printer 110 includes an information processing controller unit 200, an operation unit 211, a printer controller unit 212, a printer 213, a scanner controller unit 214, and a scanner 215.

The information processing controller unit 200 is a controller that comprehensively controls information processing related to the operation of the multi-function printer 110, and is connected to the operation unit 211. The information processing controller unit 200 is connected to the printer controller unit 212 for controlling the printer 213 that serves as an image output device, and also connected to the scanner controller unit 214 for controlling the scanner 215 that serves as an image input device. Further, the information processing controller unit 200 is connected to a payment machine 216 that receives payment of printing expenses.

The information processing controller unit 200 includes a CPU (Central Processing Unit) 201. The CPU201 activates an operating system (OS) by a boot program stored in a read only memory (ROM) 202 or the like. The CPU201 executes an application program stored in a hard disk drive (HDD) 204 or the like on the OS, thereby executing various kinds of processing. A random access memory (RAM) 203 is used as a work area of the CPU201. The RAM203 provides a work area and an image memory area for temporarily storing an image.

The hard disk drive (HDD) 204 stores the application program, image data, various setting values, and histories. The HDD 204 may be replaced with or used together with a solid state drive (SSD), an embedded multimedia card (eMMC), or the like.

In addition to the ROM202, the RAM203, the HDD204, the CPU201 is also connected to a network 205, an operation unit I/F 206, an image processing unit 207, a device controller I/F 208, and a power control unit 209 via a system bus 210.

The network 205 is a network interface card (NIC) that is connected to the network 100. The network 205 inputs information from the operation terminal 120 connected to the network 100, and outputs information to the operation terminal 120 via the network 100. The operation unit I/F 206 is an interface with the operation unit 211 having a touch panel, and outputs to the operation unit 211 an image to be displayed in the operation unit 211. Further, the operation unit I/F 206 transmits information input by a user through the operation unit 211 to the CPU201.

The image processing unit 207 performs various processing. The processing may include outputting an image to the printer 213, inputting an image from the scanner 215, rotating an image, compressing an image, converting a resolution, converting a color space, and converting gradation. The power control unit 209 controls power of the entire device. In addition to on/off control of the power, the power control unit 209 shifts a mode to a power saving mode other than a normal power mode, shifts the mode back to the normal power mode. The device controller I/F 208 is connected to the printer controller unit 212, the scanner controller unit 214, and the payment machine 216. The device controller I/F 208 performs synchronous/asynchronous conversion of image data.

Figure 2B:
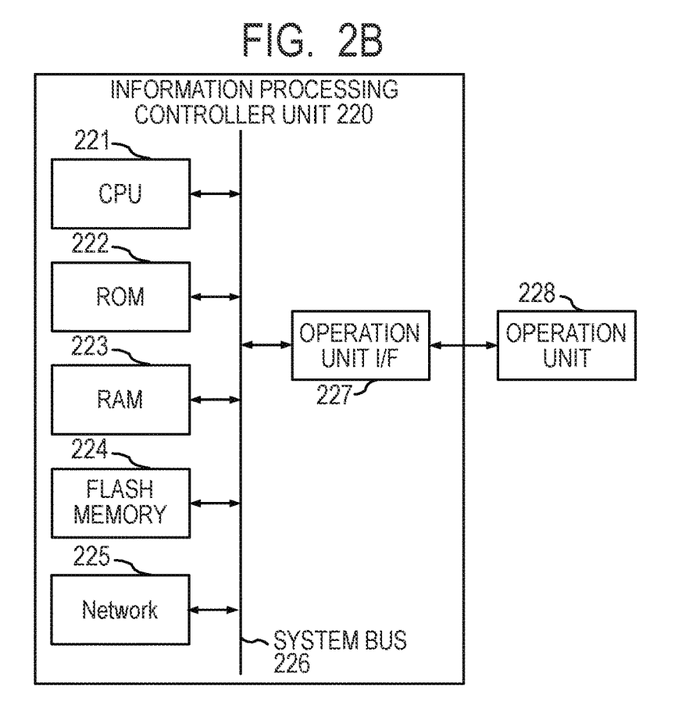
FIG. 2B shows a hardware configuration of devices included in the system according to one or more aspects of the present disclosure.

FIG. 2B is a block diagram showing an example of a hardware configuration of the operation terminal 120. The operation terminal 120 includes an information processing controller unit 220 and an operation unit 228. The operation terminal 120 is a smartphone or a tablet including a camera (not illustrated). Descriptions of a CPU 221, a ROM 222, a RAM 223, a network 225, and a system bus 226 shown in FIG. 2B are omitted, as they are same as the CPU 201, the ROM 202, the RAM 203, the network 205, and system bus 210 of the multi-function printer 110 shown in FIG. 2A, respectively.

The information processing controller unit 220 includes a flash memory 224 and an operation unit I/F 227. The flash memory 224 stores application programs, image data, various setting values, and histories. The flash memory 224 may be replaced with or used together with an SSD, an eMMC, or the like. The operation unit I/F 227 is an interface with the operation unit 228 such as a liquid-crystal panel or buttons, and transmits information input by a user through a panel touch or a press of buttons to the CPU221. In addition, the operation unit I/F 227 transmits to the operation unit 228 data such as an image or video to be displayed in the operation unit 228.

Figure 2C:
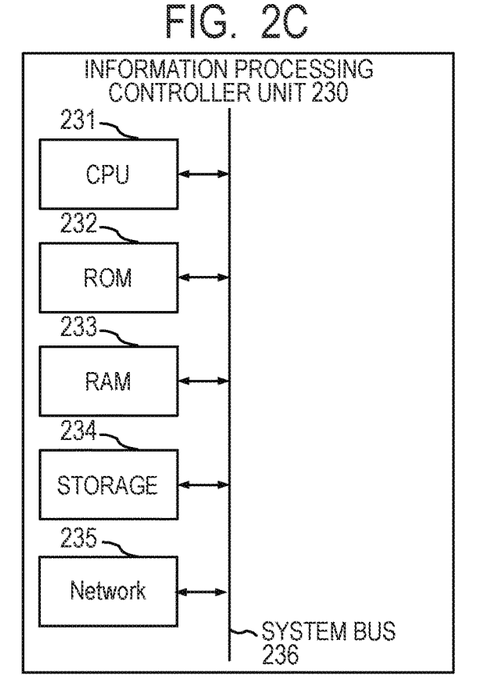
FIG. 2C is shows a hardware configuration of devices included in the system according to one or more aspects of the present disclosure.

FIG. 2C is a block diagram showing an example of a hardware configuration of an information processing device (information processing controller unit 230) constituting the cloud service server 130a. Descriptions of a CPU 231, a ROM 232, a RAM 233, a network 235, and a system bus 236 shown in FIG. 2C are omitted, as they are same as the CPU 201, the ROM 202, the RAM 203, the network 205, and system bus 210 of the multi-function printer 110 shown in FIG. 2A, respectively. The information processing controller unit 230 includes a storage 234 that stores application programs, image data, various setting values, and histories. The storage 234 may be an HDD or an SSD, for example.

Figure 2D:
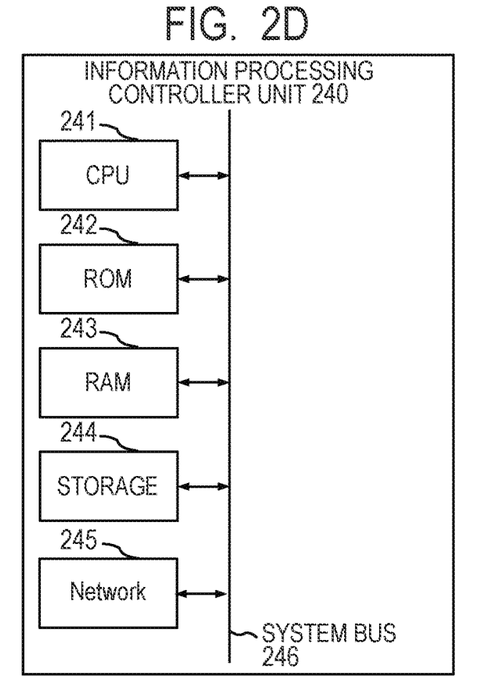
FIG. 2D shows a hardware configuration of devices included in the system according to one or more aspects of the present disclosure.

FIG. 2D is a block diagram showing an example of a hardware configuration of an information processing device (information processing controller unit 240) constituting the cloud service server 130b. Descriptions of a CPU 241, a ROM 242, a RAM 243, a storage 244, a network 245, and a system bus 246 shown in FIG. 2D are omitted, as they are same as the CPU 231, the ROM 232, the RAM 233, the storage 234, the network 235, and system bus 236 shown in FIG. 2C, respectively. The cloud service servers 130a and 130b may be implemented based on the cloud computing technology, and they may be implemented by a single computer or multiple computers.

Figure 3A:
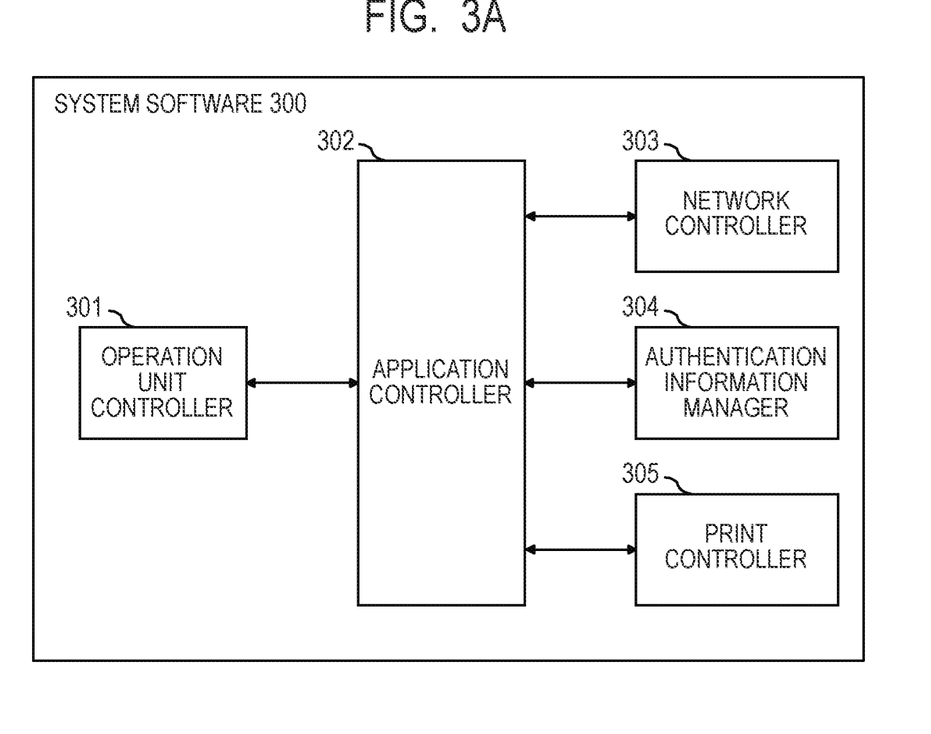
FIG. 3A shows a software configuration in the system according to one or more aspects of the present disclosure.
Figure 3B:
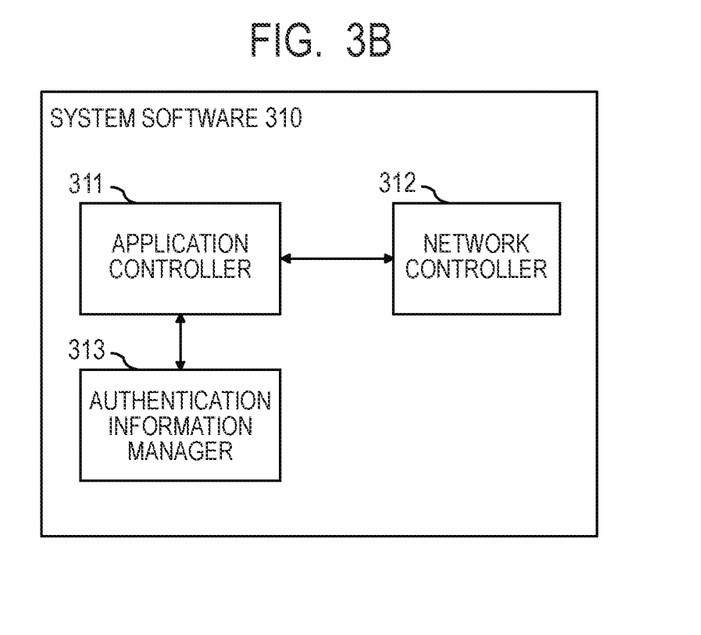
FIG. 3B shows a software configuration in the system according to one or more aspects of the present disclosure.
Figure 3C:
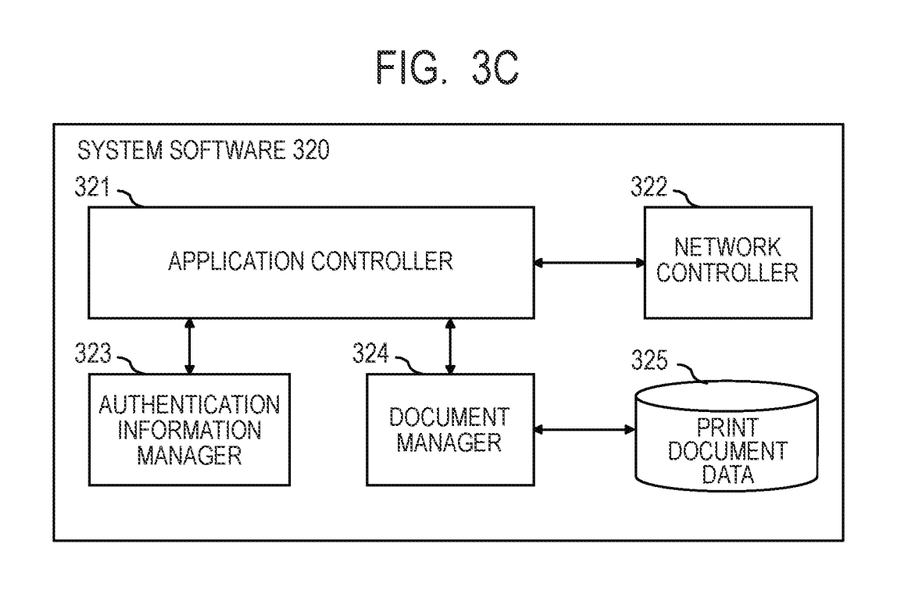
FIG. 3C shows a software configuration in the system according to one or more aspects of the present disclosure.
Figure 3D:
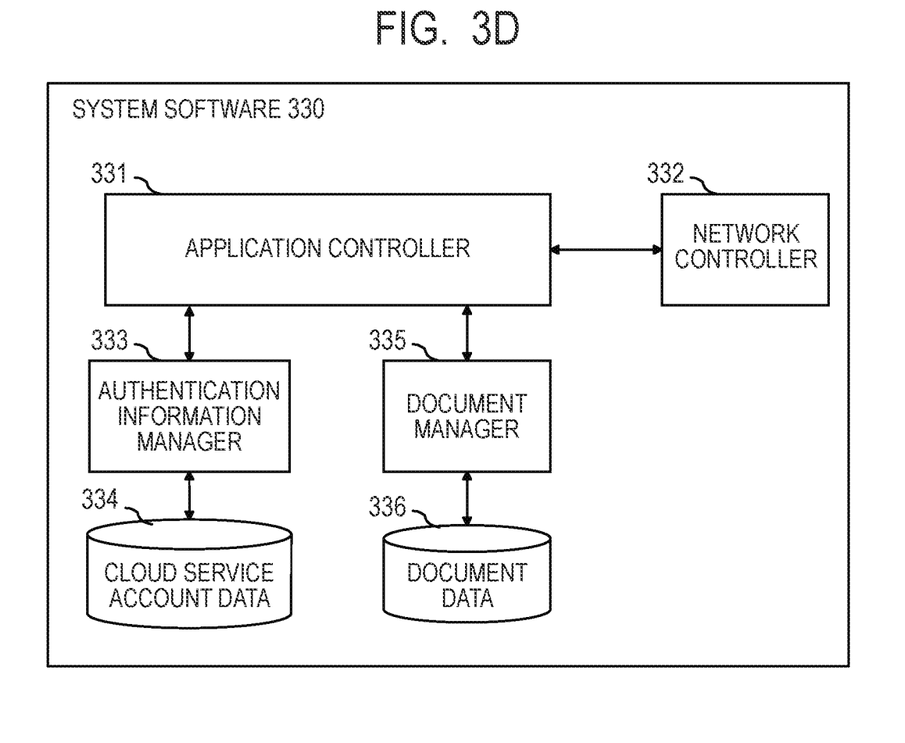
FIG. 3D shows a software configuration in the system according to one or more aspects of the present disclosure.

FIGS. 3A and 3D are block diagrams showing software configurations of the system according to the present embodiment.

FIG. 3A is a block diagram showing an example of a software configuration of the multi-function printer 110. The CPU201 of the multi-function printer 110 executes a program stored in any one of storage devices including the ROM202, the RAM203, and the HDD204 to realize functions of the units shown in FIG. 3A.

In a system software 300, an operation unit controller 301 has a function of receiving a user operation from the operation unit 211 and passing operation information to an application controller 302. Further, the operation unit 211 displays a screen in response to an instruction from the application controller 302. The application controller 302 has a function of controlling an application program (hereinafter also referred to as an "application") for using a cloud service and controlling an application for performing printing.

A network controller 303 has a function of communicating with the operation terminal 120 and the cloud service servers 130a, 130b via the network 100. An authentication information manager 304 has a function of managing authentication information for using a cloud service. A print controller 305 has a function of controlling print processing for outputting a document from the printer 213 when receiving an instruction for printing.

FIG. 3B is a block diagram showing an example of a software configuration of the operation terminal 120. The CPU221 of the operation terminal 120 executes a program stored in any one of storage devices including the ROM222, the RAM223, and the flash memory 224 to realize functions of the respective units shown in FIG. 3B.

In a system software 310, an application controller 311 has a function of controlling an application for using a cloud service. A network controller 312 has a function of communicating with the multi-function printer 110 and the cloud service servers 130a, 130b via the network 100. An authentication information manager 313 has a function of managing authentication information for using a cloud service.

FIG. 3C is a block diagram showing an example of a software configuration of the cloud service server 130a. Functions of the units shown in FIG. 3C are realized by the CPU231 of the cloud service server 130a executing a program stored in any of storage devices including the ROM232, the RAM233, and the storage 234.

In a system software 320, an application controller 321 has a function of controlling an application for managing users of a cloud service and controlling an application for managing uploaded documents. A network controller 322 has a function of communicating with the multi-function printer 110, the operation terminal 120, and the other cloud service server 130b via the network 100. An authentication information manager 323 has a function of managing authentication information of users of a cloud service. A document manager 324 has a function of managing print document data 325 stored in the storage 234.

FIG. 3D is a block diagram showing an example of a software configuration of the cloud service server 130b. Functions of the units shown in FIG. 3D are realized by the CPU241 of the cloud service server 130b executing a program stored in any of storage devices including the ROM242, the RAM243, and the storage 244.

In a system software 330, an application controller 331 has a function of controlling an application for managing users of a cloud service and controlling an application for managing documents in the cloud service. A network controller 332 has a function of communicating with the multi-function printer 110, the operation terminal 120, and the other cloud service server 130a via the network 100. An authentication information manager 333 has a function of managing account data 334 of users of the cloud service stored in the storage 244. A document manager 335 has a function of managing document data 336 stored in the storage 244.

Figure 4:
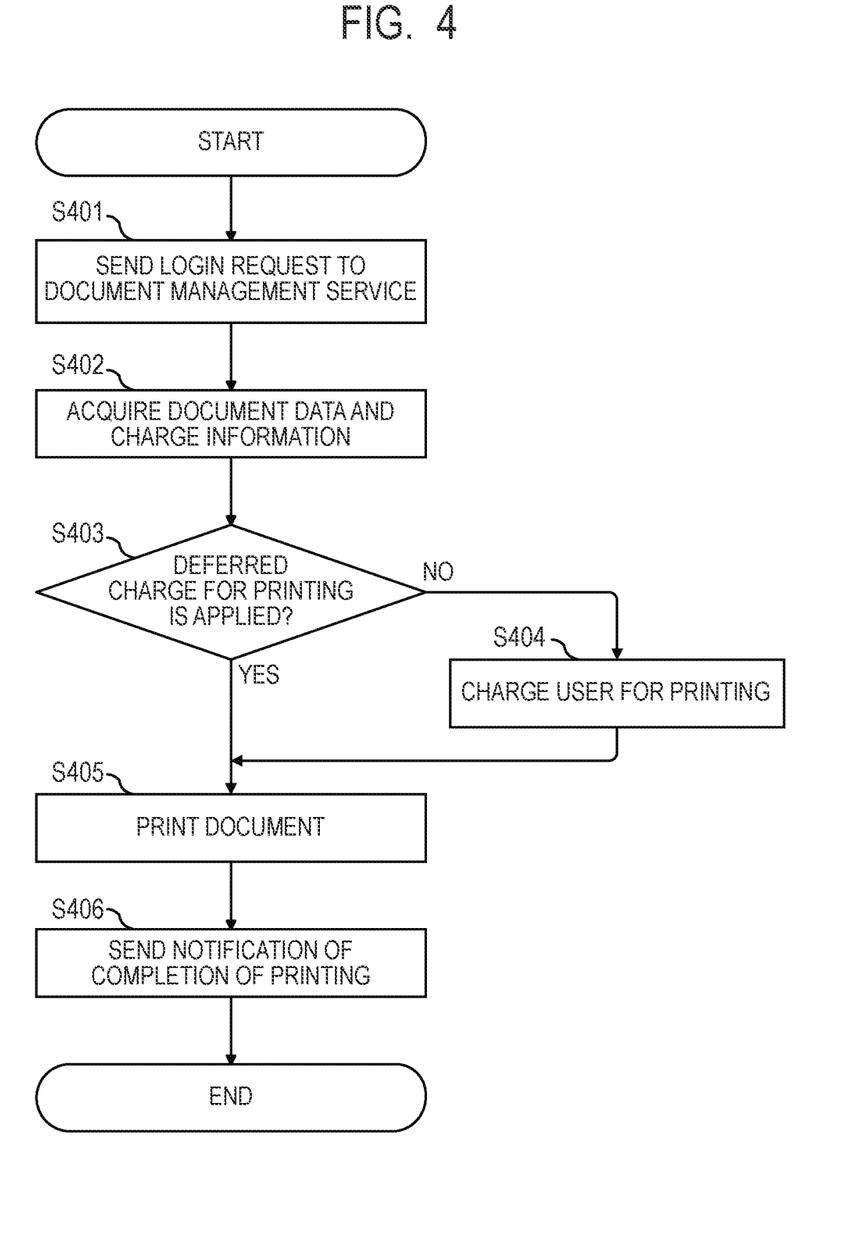
FIG. 4 is a flowchart showing processes performed by a multi-function printer in the system according to the present embodiment.

FIG. 4 is a flowchart showing printing processing performed by the multi-function printer 110 with using the print cloud service and the document management service. The processing is executed in the system software 300 operated by the CPU201 of the information processing controller unit 200.

First, the application controller 302 transmits, to the document management service via the cloud service server 130a, a login request (authentication request) including authentication information for logging in to the document management service (step S401). That is, the application controller 302 transmits the login request to the cloud service server 130a, and the cloud service server 130a transfers the login request to the document management service.

The authentication information (e.g., an ID and a password) required to log in to the document management service may be input by a user via the operation unit 228, or may be input from the operation terminal 120 via a wireless connection such as Wi-Fi®, Bluetooth®, or NFC. For example, a user may input the authentication information by operating a predetermined button (a button for logging in to the document management service and performing printing) provided on an operation screen displayed in the operation unit 211 of the multi-function printer 110. Further, a code such as a QR Code® for logging in to the document management service may be displayed in the operation unit 228 in response to an operation of a predetermined button. The code may be read by an application of the operation terminal 120, and the multi-function printer 110 may be notified of the code via Wi-Fi or the like.

Thereafter, the application controller 302 acquires a result of the login request via the cloud service server 130a. When the login to the document management service has failed, the application controller 302 ends the processing of this flowchart (not shown). On the other hand, when the login to the document management service is successful, the application controller 302 stores the authentication information of the document management service in the authentication information manager 304. The authentication information stored here may be an authentication token returned from the document management service when the login to the document management service is successful, or authentication information (for example, an ID or a password) transmitted together with the login request.

When the login to the document management service is successful in step S401, the application controller 302 receives, from the document data 336 managed by the cloud service server 130b, designation of document data to be printed using the cloud print service. In step S402, the application controller 302 transmits, to the document management service via the cloud service server 130a, an acquisition request for acquiring the user-specified document data and charge information (described later) together with the stored authentication information. That is, the application controller 302 transmits the acquisition request and the authentication information to the cloud service server 130a, and the cloud service server 130a transfers the acquisition request and the authentication information to the document management service.

The charge information corresponds to information indicating whether charging a user for printing of the document data designated by the user of the cloud print service may be deferred or not. For example, the charge information may be any two types of character strings such as "TRUE" and "FALSE" to distinguish whether the deferred charge for printing may be applied or not. The charge information may also be bool values or other numbers (for example, zero and a numerical value other than zero) to distinguish whether the deferred charge for printing may be applied or not. Furthermore, the charge information to distinguish whether the deferred charge for printing is applied or not may be the fact that an URL (Uniform Resource Locator) indicating a user to be charged later for printing has been obtained or not.

Then, when the application controller 302 acquires the requested document data via the cloud service server 130a, the application controller 302 advances the processing to step S403.

In step S403, the application controller 302 determines whether or not the deferred charge is applied to the printing of the acquired document data using the cloud print service. To be more specific, the application controller 302 makes the above determination based on the charge information acquired in step S402. In case of using two types of character strings "TRUE" and "FALSE" shown above as an example, the application controller 302 determines that the deferred charge is applied when the charge information indicates "TRUE", and the application controller 302 determines that the deferred charge is not applied when the charge information indicates "FALSE". When the charge information cannot be acquired, the application controller 302 determines that the deferred charge is not applied.

When the application controller 302 determines that the deferred charge is not applied (NO in step S403), the application controller 302 charges the user for the printing (step S404). Specifically, the application controller 302 displays the printing cost on the operation unit 211 to charge the user for the printing cost, and waits for the user making the payment for the printing through the payment machine 216. Then, when it is confirmed that the payment for the printing has been made, the application controller 302 advances the processing to step S405.

On the other hand, when the application controller 302 determines that the deferred charge is applied (YES in step S403), the application controller 302 advances the processing from step S403 to step S405.

In step S405, the application controller 302 starts a printing process of the document data. More specifically, the application controller 302 issues an instruction for the printing to the print controller 305, and the print controller 305 prints the document using the printer 213. That is, the print controller 305 performs the printing without requesting the user to make immediate payment for the printing (because the user will be requested later to make a lump-sum payment) when the deferred charge is applied. On the other hand, when the deferred charge is not applied, the print controller 305 requests the user to make immediate payment for the printing, and performs the printing after confirming the payment. As described above, when the deferred charge is applied, the user can receive a printing service without making immediate payment for the printing (but with making a lump-sum payment instead) while the user is logged in to the document management service.

After printing the document in step S405, the application controller 302 transmits a notification of completion of the printing to the print cloud service (step S406), and ends the processing of the flowchart. To be specific, the application controller 302 transmits, as the notification of completion of the printing, date and time of the printing performed, user information, information of the printed document, a charge for the printing, and the like to the cloud service server 130a.

Figure 5:
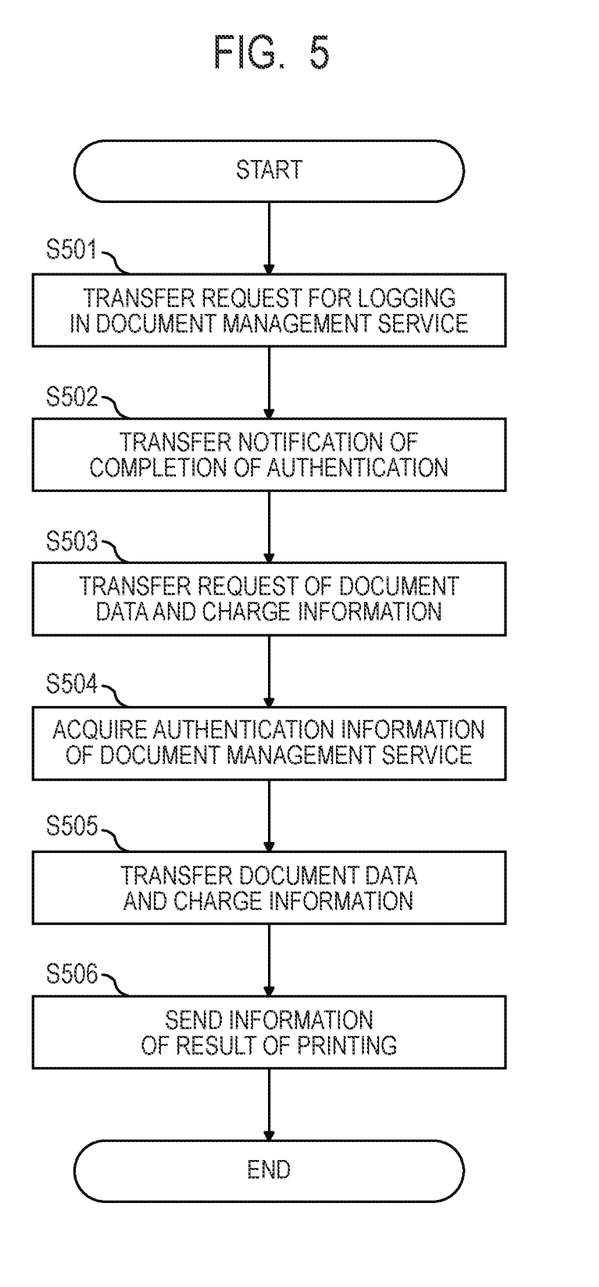
FIG. 5 is a flowchart showing processes of a print cloud service in the system according to one or more aspects of the present disclosure.

FIG. 5 is a flowchart describing processes of the print cloud service provided by the cloud service server 130a in the print processing with using the print cloud service and the document management service. The processing is executed in the system software 320 operated by the CPU 231 of the information processing controller unit 230 included in the cloud service server 130a.

First, the application controller 321 transfers, to the cloud service server 130b, a login request for logging in to the document management service transmitted from the multi-function printer 110 (step S501). Specifically, first, the application controller 321 checks contents of the request received from the multi-function printer 110. When the application controller 321 determines that the request is a login request for logging in to the document management service, the application controller 321 transfers the request to the cloud service server 130b. Any other manners may be used to transmit the login request from the multi-function printer 110 to the cloud service server 130b via the cloud service server 130a.

After transferring the login request in step S501, the application controller 321 transfers an original notification of completion of authentication (notification of an effect of login) transmitted from the cloud service server 130b to the multi-function printer 110 that is the source of the authentication request (step S502). To be specific, the application controller 321 receives the notification of completion of authentication from the cloud service server 130b, then extracts an address of the source of the authentication request from the notification, and then transfers the notification to the address. Any other manners may be used to transmit the notification of completion of authentication from the cloud service server 130b to the multi-function printer 110 via the cloud service server 130a.

After transferring the notification of completion of authentication in step S502, the application controller 321 transfers, to the cloud service server 130b, an original request toward the document management service transmitted from the multi-function printer 110 for acquiring a document and the charge information (step S503). The specific way for acquisition is same as the way used in step S501.

After the request of document acquisition is transferred in step S503, the application controller 321 acquires authentication information of the document management service (step S504). Specifically, the application controller 321 stores, in the authentication information manager 323, the authentication information that has been used when the request for acquiring the document was received from the multi-function printer 110.

Further, the application controller 321 transfers to the multi-function printer 110 original document data and the original charge information that have been transmitted from the cloud service server 130b (step S505). The specific manner of the transfer is same as the step S502. When the charge information has not been received, only the document data is transferred. The process order of step S504 and step S505 may be reversed.

After transferring the document data and the charge information in step S505, the application controller 321 transmits information of result of printing the document to the cloud service server 130b (step S506), and ends the processing of the flowchart. To be specific, the application controller 321 transmits, to the cloud service server 130b, information such as the date and time of the printing performed, user information, information of the document printed, and a charge of the printing. The above information is transmitted as the notification of completion of the printing from the multi-function printer 110 by using the authentication information acquired in step S504. However, the specific manner of the above process is not limited to the above, and the application controller 321 may generate the information of result of printing based on the notification of completion of printing transmitted from the multi-function printer 110, and transmit the information of result of printing to the cloud service server 130b.

Figure 6:
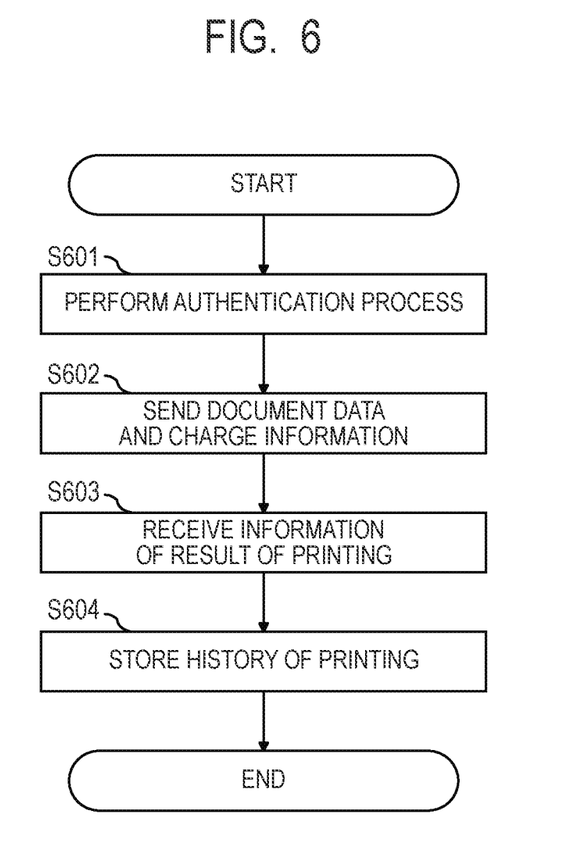
FIG. 6 is a flowchart showing processes of a document management service in the system according to one or more aspects of the present disclosure.

FIG. 6 is a flowchart describing processes of the document management service provided by the cloud service server 130b in print processing with using the print cloud service and the document management service. This processing is executed in the system software 330 operated by the CPU241 of the information processing controller unit 240 included in the cloud service server 130b.

First, when the application controller 331 receives, via the cloud service server 130a, a login request transmitted from the multi-function printer 110 in step S401 of FIG. 4, the application controller 331 performs authentication processing based on the login request (step S601). Specifically, the application controller 331 refers to data stored in the cloud service account data 334 managed by the authentication information manager 333, and authenticates the corresponding user based on the authentication information transmitted from the multi-function printer 110. After the authentication is completed, the application controller 331 transmits a notification of completion of authentication to the multi-function printer 110 via the cloud service server 130a. That is, the application controller 331 transmits the notification of completion of authentication to the cloud service server 130a, and the cloud service server 130a transfers the notification of completion of authentication to the multi-function printer 110. When the authentication is successful, the application controller 331 may transmit an authentication token together with the notification of completion of authentication.

After the application controller 331 receives, via the cloud service server 130a, the request for acquiring document data and the charge information that has been transmitted from the multi-function printer 110 in step S402 of FIG. 4, the application controller 331 transmits the document data and the charge information (step S602). Specifically, based on the acquisition request, the application controller 331 refers to data stored in the document data 336 managed by the document manager 335, and acquires the document requested by the multi-function printer 110.

Then, the application controller 331 acquires the charge information. The determination on whether the deferred charge is applied or not may be made on an account basis or a document basis. For example, in case of the account basis, information indicating whether the deferred charge is applied to the respective accounts are prepared in the cloud service account data 334 beforehand, and the above information (e.g., parameters) is used as the charge information. In case of the document basis, parameters indicating whether the deferred charge is applied to the respective documents are prepared in the document data 336 beforehand, and these parameters are used as the charge information. The determination may be made based on the combination of the above determinations made on the account basis and the document basis. In case of combining the above determinations, it may be determined that the deferred charge is applied when determined that the deferred charge is applied on both the account and document bases. Alternatively, it may be determined that the deferred charge is applied when determined that the deferred charge is applied on the account basis or the document basis. Further, it may be determined whether the deferred charge is applied or not based on other information than users or documents such as types of cloud services used, frequency of printings, or the amount of the deferred charge during a predetermined period of time. In addition, the information used to determine whether the deferred charge is applied or not may be automatically set by the system software based on contract with users.

The document data is not necessarily stored in the cloud service server 130b, and may be acquired from an external server. The application controller 331 transmits the acquired document data and the acquired charge information to the multi-function printer 110 via the cloud service server 130a. That is, the application controller 331 transmits the document data and the charge information to the cloud service server 130a, and the cloud service server 130a transfers the document data and the charge information to the multi-function printer 110.

After transmitting the document data in step S602, the application controller 331 receives information of result of printing from the cloud service server 130a (step S603). To be more specific, the information of result of printing is information transmitted from the cloud service server 130a in step S506 of FIG. 5, and includes information of the date and time of printing performed, information of the user who performed the printing, information of the document printed, and a charge for the printing.

Upon receiving the information of result of printing in step S603, the application controller 331 stores the received information of result of printing (step S604), and ends the processing of this flowchart. To be specific, the application controller 331 stores or adds the information received in step S603 in information of print history held by the cloud service account data 334. Thus, the document management service can store and manage the information of print history (including charges for the printing) of the user by associating the above information with the user account.

Furthermore, at a predetermined timing (for example, a timing specified for each account (e.g., at the end of each month)), the application controller 331 performs processing for collective billing for the deferred charge based on the information of print history managed in association with the user account. That is, the application controller 331 performs processing for charging the user corresponding to the user account for the printing based on the information of print history linked to the user account. The above processing allows the document management service to provide, with only an account of the document management service, services similar to the collective billing service for the deferred charge provided by the print cloud service based on the information of print history managed by the cloud service account data 334.

According to the present exemplary embodiment, a document is acquired from a document management service via a print service, and then the document is printed using the print service. The present embodiment allows to manage the charge for the printing in the document management service by associating the charge for the printing with a user account. The above management allows to charge the user later collectively for the printings instead of immediately demanding the payment (on the spot) from the user performing printing. That is, it becomes possible to provide users of the document management service with services similar to the service of collective and deferred charge for printing provided by the print service.

As described above, in case of a user logging in to a print service with an account of another service that cooperates with the print service and performing printing by using the print service, it becomes possible to charge the user in future for the printing. Therefore, the usability can be improved for users of a system allowing multiple cloud services to operate cooperatively with using a single cloud service account.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-167808, filed Oct. 19, 2022, which is hereby incorporated by reference herein in its entirety.

What is claimed is:

1. A system providing a print service for performing printing via an image processing apparatus and a management service for managing documents and operating cooperatively with the print service, the system including a memory that stores a program and a processor that executes the program to perform:
   transferring, from the print service to the management service, an authentication request received from the image processing apparatus;
   executing, in the management service, an authentication process based on the authentication request received from the print service;
   transferring, from the print service to the management service, an acquisition request of acquiring a document and authentication information received from the image processing apparatus;
   in receipt of the acquisition request from the print service, transmitting charge information from the management service to the print service, the charge information indicating whether provision of the document and printing of the document via use of the print service correspond to predetermined charging or not;
   transmitting, from the print service to the image processing apparatus, the charge information and the document received from the management service;
   when the printing of the document is performed using the image processing apparatus, transmitting, from the print service to the management service, information of the printing and the authentication information;
   managing the information of the printing in the management service, the managing including linking the information of the printing to a user account corresponding to the authentication information received from the print service; and
   executing a process for charging a user corresponding to the user account for the printing based on the information of the printing.

2. The system according to claim 1, wherein the image processing apparatus is configured to:
   transmit the authentication request for the management service to the print service;
   transmit, to the print service, the authentication information for logging in the management service and the acquisition request;
   receive the document and the charge information from the print service; and
   print the document without immediately charging the user for the printing when the charge information indicates that the printing corresponds to the predetermined charging.

3. The system according to claim 2, wherein the image processing apparatus prints the document after charging the user for the printing when the charge information indicates that the printing does not correspond to the predetermined charging.

4. The system according to claim 1, wherein the charge information is based on at least one of the document and the user account corresponding to the authentication information.

5. The system according to claim 1, wherein the charge information is based on one of a type of the print service, a frequency of printing, and an amount charged for printing in a predetermined period of time.

6. The system according to claim 1, wherein the information of the printing includes information of a printing cost charged for the printing.

7. A method of controlling a system that provides a print service for performing printing via an image processing apparatus and a management service for managing documents and operating cooperatively with the print service, the method comprising:
- transferring, from the print service to the management service, an authentication request received from the image processing apparatus;
- executing, in the management service, an authentication process based on the authentication request received from the print service;
- transferring, from the print service to the management service, an acquisition request of acquiring a document and authentication information received from the image processing apparatus;
- in receipt of the acquisition request from the print service, transmitting charge information from the management service to the print service, the charge information indicating whether provision of the document and printing of the document via use of the print service correspond to predetermined charging or not;
- transmitting, from the print service to the image processing apparatus, the charge information and the document received from the management service;
- when the printing of the document is performed using the image processing apparatus, transmitting, from the print service to the management service, information of the printing and the authentication information;
- managing the information of the printing in the management service, the managing including linking the information of the printing to a user account corresponding to the authentication information received from the print service; and
- executing a process for charging a user corresponding to the user account for the printing based on the information of the printing.

8. The method according to claim 7 further comprising:
- transmitting the authentication request for the management service from the image processing apparatus to the print service;
- transmitting, from the image processing apparatus to the print service, the authentication information for logging in the management service and the acquisition request;
- receiving the document and the charge information from the print service in the image processing apparatus; and
- printing the document in the image processing apparatus without immediately charging the user for the printing when the charge information indicates that the printing corresponds to the predetermined charging.

* * * * *